United States Patent
Osawa et al.

(10) Patent No.: US 7,345,784 B2
(45) Date of Patent: Mar. 18, 2008

(54) IMAGE FORMING APPARATUS AND IMAGE FORMING METHOD

(75) Inventors: Masahiro Osawa, Hachioji (JP); Takao Kurohata, Hachioji (JP); Shinya Tanigami, Hachioji (JP)

(73) Assignee: Konica Corporation, Tokyo (JP)

( * ) Notice: Subject to any disclaimer, the term of this patent is extended or adjusted under 35 U.S.C. 154(b) by 1047 days.

(21) Appl. No.: 10/411,021

(22) Filed: Apr. 10, 2003

(65) Prior Publication Data

US 2003/0202191 A1 Oct. 30, 2003

(30) Foreign Application Priority Data

Apr. 30, 2002 (JP) ............... 2002-128251

(51) Int. Cl.
*B41B 15/00* (2006.01)
*G03G 15/00* (2006.01)

(52) U.S. Cl. .......................... 358/1.2; 399/15
(58) Field of Classification Search ............ 358/1.2, 358/444, 408, 452, 448, 1.15, 296; 399/183, 399/82, 15; 355/203, 218, 324; 382/294, 382/296, 297, 290
See application file for complete search history.

(56) References Cited

U.S. PATENT DOCUMENTS 5,461,459 A * 10/1995 Muramatsu et al. ......... 399/15
5,627,650 A * 5/1997 Nosaki et al. ............. 358/296
6,427,058 B1 * 7/2002 Akiba et al. ............... 399/82

FOREIGN PATENT DOCUMENTS

| JP | 10-107998 A | 4/1998 |
| JP | 11-331546 A | 11/1999 |
| JP | 2000-184179 A | 6/2000 |

* cited by examiner

*Primary Examiner*—Thomas D. Lee
*Assistant Examiner*—Saeid Ebrahimi
(74) *Attorney, Agent, or Firm*—Frishauf, Holtz, Goodman & Chick, P.C.

(57) ABSTRACT

An image forming apparatus comprises: an image reading section for reading a plurality of document images of a document having a plurality of sheets page by page, the document being set on a reading position in a state that image directions of the document images are mixed; a designating section for designating each image direction of the document images of the document set on the reading position; a storing section for storing the document images read by the image reading section; an image forming section for recognizing each rotation angle for directing the stored document images to a reference direction which is previously set, in accordance with each designated image direction, and for forming a plurality of output images by rotating the document images by each recognized rotation angle; and an output section for outputting the formed output images.

8 Claims, 16 Drawing Sheets

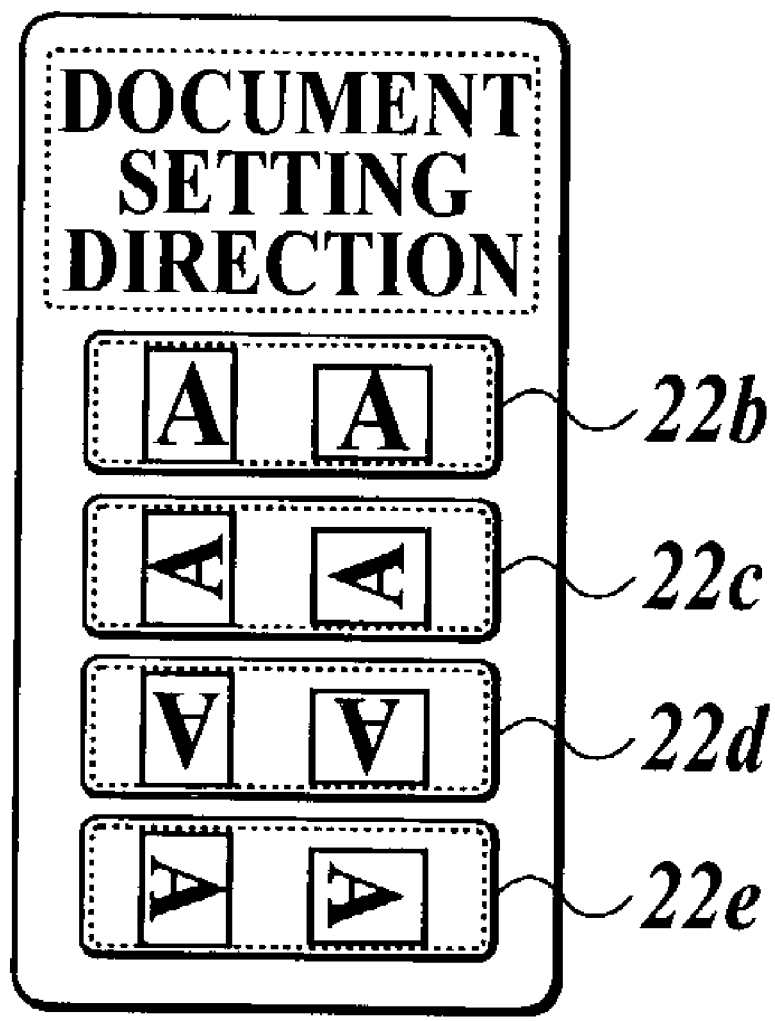

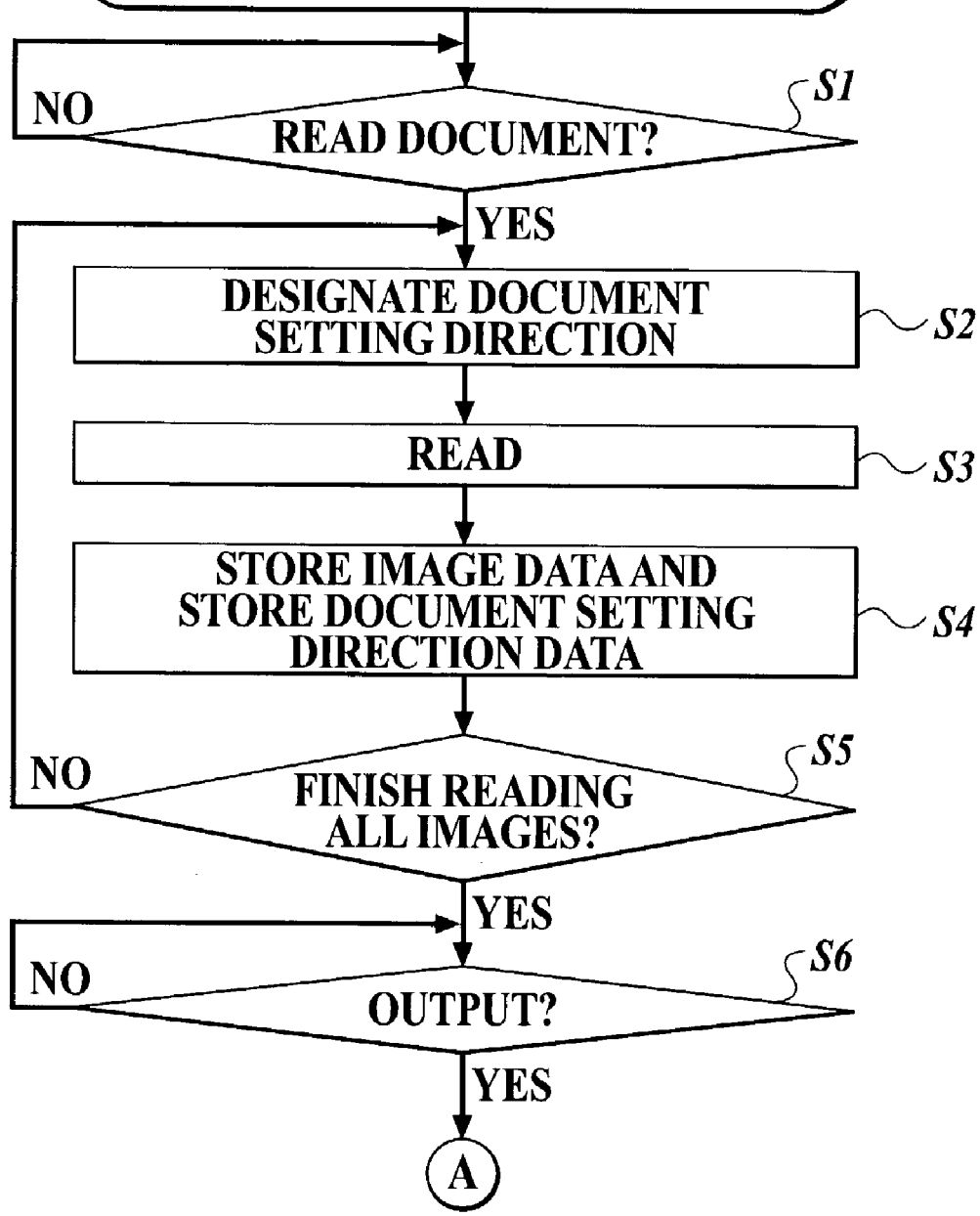

FIG. 7A
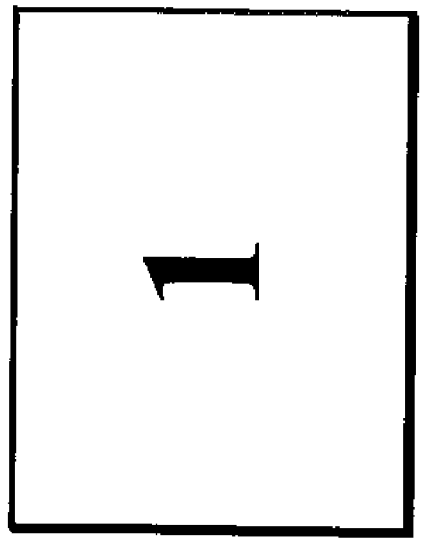
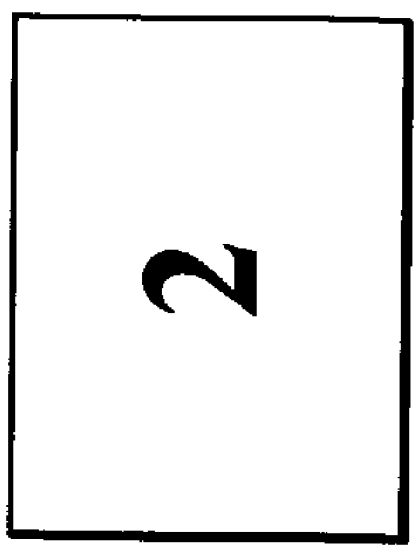

FIG.9A
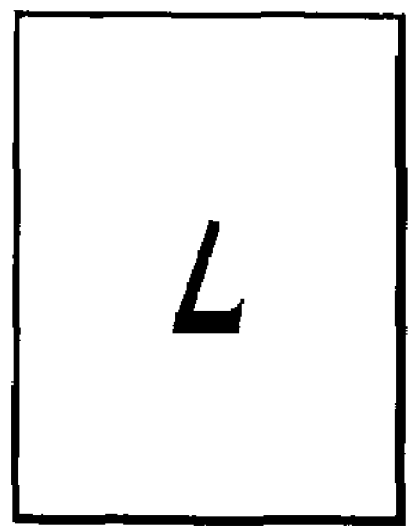

IMAGE FORMING APPARATUS AND IMAGE FORMING METHOD

BACKGROUND OF THE INVENTION

1. Field of the Invention

The present invention relates to an image forming apparatus and an image forming method.

2. Description of Related Art

According to an earlier development, in an image forming apparatus, such as a digital copy machine or the like, when a user designates output conditions, such as a paper size, a paper direction, one-sided/two-sided copies, or the like, to output an image, a document image of an original document set on a contact glass is read. By carrying out an image processing, such as enlargement, reduction, rotation or the like, for the document image read in accordance with the output conditions, it is possible to obtain a suitable output image which is desirable for a user.

For example, in a copy mode, an image forming apparatus has a function for obtaining a suitable output image which is adapted to an output paper direction designated by a user, by rotating the read document image so as to direct it to the output paper direction when a detected paper direction of the set document is different from the output paper direction. In case that the image information described on both surfaces of an original document sheet is read to print out the information from a discharging section in a copy mode, or to output the information to an information terminal device connected through a network in a scanner mode, an image forming apparatus detects a document direction automatically or manually in order to prevent the images from being turned upside down, by rotating a rear surface image by 180° when the upside of the front surface image is inverted to that of the rear surface image.

However, in an image forming apparatus according to an earlier development, when a set document having a plurality of sheets is read to output it, an image processing is carried out on the assumption that all of the sheets of the set document have the same image direction. Therefore, for example, when the document having a plurality of sheets in which the various image directions are mixed, is set to read and output the images in a scanner mode, the image directions of the images obtained at the information terminal device are not coincident with each other. There was a problem that it was very difficult for a user to see the images.

SUMMARY OF THE INVENTION

In order to solve the above-described problems, an object of the present invention is to provide an image forming apparatus and an image forming method which can unify the image directions of the output images when a document having a plurality of sheets in which various image directions are mixed is read to output it.

That is, in accordance with the first aspect of the present invention, an image forming apparatus comprises:

an image reading section for reading a plurality of document images of a document having a plurality of sheets page by page, the document being set on a reading position in a state that image directions of the document images are mixed;

a designating section for designating each image direction of the document images of the document set on the reading position;

a storing section for storing the document images read by the image reading section;

an image forming section for recognizing each rotation angle for directing the stored document images to a reference direction which is previously set, in accordance with each designated image direction, and for forming a plurality of output images by rotating the document images by each recognized rotation angle; and an output section for outputting the formed output images.

In accordance with the second aspect of the present invention, an image forming method comprises:

reading a plurality of document images of a document having a plurality of sheets page by page, the document being set on a reading position in a state that image directions of the document images are mixed;

designating each image direction of the document images of the document set on the reading position;

storing the read document images;

recognizing each rotation angle for directing the stored document images to a reference direction which is previously set, in accordance with each designated image direction, and forming a plurality of output images by rotating the document images by each recognized rotation angle; and outputting the formed output images.

According to the present invention, in the image forming apparatus, each image direction of the document images of the document set on the reading position in a state that the image directions of the document images are mixed, is designated. The document images read by the image reading section are stored in the storing section. Each rotation angle for directing the stored document images to the reference direction which is previously set, is recognized in accordance with each designated image direction. The document images are rotated by each recognized rotation angle to form the output images. The formed outputted images are outputted. Therefore, when a plurality of the sheets in which the character (image) directions are mixed are read to output them, it is possible to designate each document image direction. As a result, the output images can be outputted so as to unify the character (image) directions thereof.

In this specification, the term "image forming" includes the meaning that an image is copied or is printed on a printing medium, such as a paper or the like, and the meaning that an image data read by an image reading device, such as a scanner or the like, is displayed on a screen, such as a display or the like.

The designating section may designate the image direction for each page.

When a bundle of sheets in which the document images have the same image directions, exists in the set document, the designating section may designate the image direction for the bundle of the sheets at once.

According to the present invention, it is possible to designate the image direction of the document images for each bundle of the sheets set on the reading position. Because the image direction of the document images can be designated for the bundle of the sheets at once, it is possible to provide a more useful image forming apparatus.

The image forming apparatus may further comprise a communication section for communicating with an external information terminal device, wherein the output section outputs the output images formed by the image forming section, to the external information terminal device through the communication section.

According to the present invention, the image forming further comprises the communication section for carrying out a data transmission/reception with an external information terminal device. The document images read by the image reading section are rotated so as to direct the images to the reference direction which is previously set. The output images are formed to output them to an external information terminal device. Therefore, the output images can be obtained so as to unify the character (image) directions at a destination information terminal device.

The output section may be a print section for printing the output images.

The rotation angle may be one selected from 270°, 180°, 90° and 0°.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 4 is a view for showing a document setting direction area on the operation screen of FIG. 3;

FIGS. 5A and 5B are a flowchart for a document direction rotation outputting process carried out by the CPU shown in FIG. 1;

FIG. 7A is a view for showing a first sheet and a second sheet shown in FIG. 6.

FIG. 9A is a view for showing a sixth sheet and a seventh sheet shown in FIG. 6.

PREFERRED EMBODIMENT OF THE INVENTION

Figure 1:
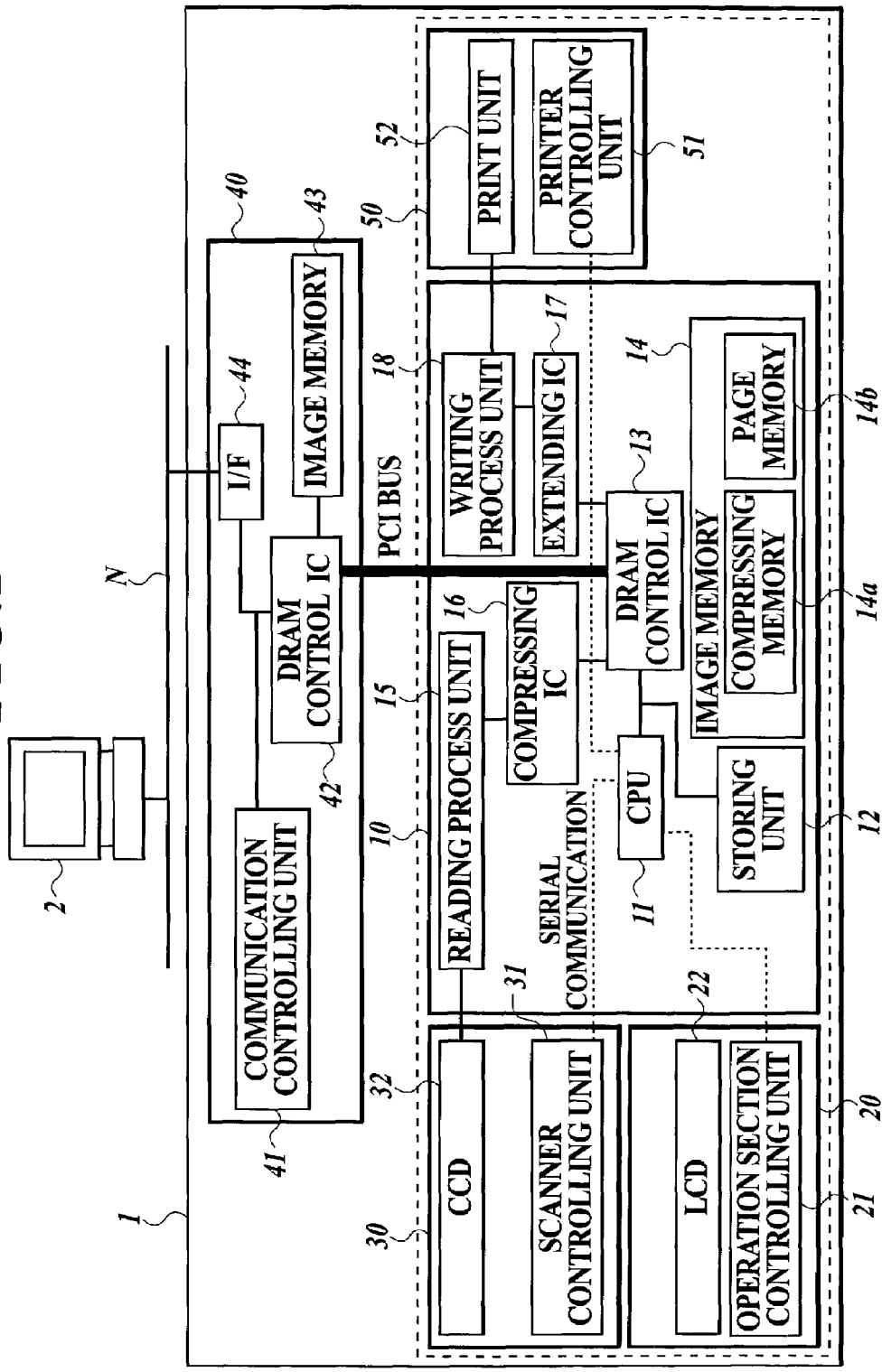
FIG. 1 is a block diagram for showing a whole structure of the present embodiment and a functional structure of an digital copy machine.

Hereinafter, the present invention will be explained with reference to the drawings.

In the present embodiment, a CPU 11 of a control section 10 has a function as an image forming section. An image memory 14 of the control section 10 has a function as a storing section. An operation section 20 has a function as a setting section. A scanner section 30 has a function as an image reading section. A communication section 40 has a function as a communicating section. The communication section 40 and a printer section 50 have a function as an output section, respectively.

Firstly, each structure of the apparatus and the like will be explained.

FIG. 1 is a block diagram for showing a whole structure of the present embodiment and a functional structure of an digital copy machine 1. As shown in FIG. 1, the digital copy machine 1 is connected with an information terminal device 2 through a network N so as to transmit and receive or input and output data mutually. In FIG. 1, as an example, one digital copy machine 1 is connected with one information terminal device 2. However, the present invention is not limited to the number of these apparatuses.

The digital copy machine 1 reads a document image of an original document which is set on a contact glass and forms an output image to copy it in a copy mode. In a printer mode, the digital copy machine 1 receives an image data, an instruction data and the like, which are transmitted from the information terminal device 2 through the network N, and forms the output image in accordance with the received data to print out it. In the scanner mode, the digital copy machine 1 reads the document image of the original document set on the contact glass, and forms the output image to transmit it to the information terminal device 2 through the network N.

The information terminal device 2 transmits the image data to be printed out, the instruction data and the like, to the digital copy machine 1 through the network N. Further, the information terminal device 2 receives the output image data transmitted from the digital copy machine 1 through the network N to display it on a display screen or to store it in a storing section.

The network N is an information communication network, such as a LAN (Local Area Network), a WAN (Wide Area Network) or the like. Either wired connections or wireless connections can be used for the connection between the devices on the network N. However, from the viewpoint of the reliability of the information management, it is desirable that the network has enough security that only specific users can access these apparatuses. In the network N, a relay device, such as a router for analyzing the transmitted and received data, setting a transmission path and forwarding data, and the like, and a line concentrating device, such as a hub having the predetermined number of ports, are included.

Hereinafter, the functional structure of the digital copy machine 1 will be explained in detail with reference to FIG. 1.

As shown in FIG. 1, the digital copy machine 1 comprises a control section 10, an operation section 20, a scanner section 30, a communication section 40 and a printer section 50.

The control section 10 comprises a CPU 11, a storing unit 12, a DRAM control IC 13, an image memory 14, a reading process unit 15, a compressing IC 16, an extending IC 17 and a writing process unit 18.

The CPU (Central Processing Unit) 11 reads out a system program stored in the storing unit 12, and expands the program into a RAM of the CPU 11, which is not shown in the drawings. The CPU 11 concentratedly controls each operation of the digital copy machine 1 in accordance with the expanded program. Further, the CPU 11 selects one from a copy mode, a printer mode and a scanner mode in accordance with the operation signal of the operation section 20 and the data inputted through the communication section 40. Then, the CPU 11 reads out the processing program corresponding to each mode, which is stored in the storing unit 12 in order to carry out each process, such as copy, print, output or the like, and the image processing in each process. In the present invention, the CPU 11 carries out the document direction rotation outputting process, which will be explained below, in accordance with the program stored in the storing unit 12.

The storing unit 12 comprises an HD (Hard Disk), a nonvolatile memory or the like. The storing unit 12 stores a system program corresponding to the digital copy machine 1, various types of processing programs which can be executed on the system program, and the like. For example, in the present embodiment, the storing unit 12 stores a copying program, a printing program, an outputting program and the like. The programs are stored in the form of program codes which can be read by a computer. The CPU 11 carries out the operation in accordance with the program codes sequentially.

In the present embodiment, the storing unit 12 has a storing area for storing a document setting direction file 121 which will be explained below, and which is stored so as to correlate document setting direction designating buttons of the operation section 20 with the document setting direction data.

Figure 2:
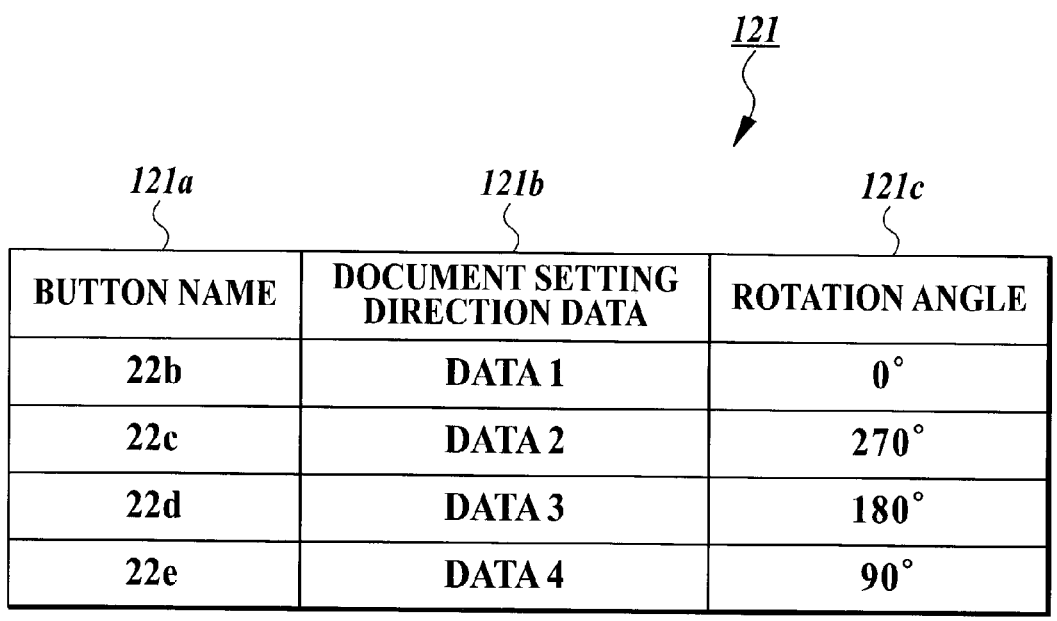
FIG. 2 is a view for showing a data storing example of a document setting direction file stored in the storing unit shown in FIG. 1.

FIG. 2 is a view for showing a data storing example of a document setting direction file 121. As shown in FIG. 2, the document setting direction file 121 comprises a button name storing area 121a for storing each identification code (for example, "22b", "22c", "22d" and "22e") assigned uniquely in order to specify the document setting direction designating button, as a "BUTTON NAME", a document setting direction data area 121b for storing each document setting direction data (for example, "DATA 1", "DATA 2", "DATA 3" and "DATA 4") which is correlated with each document setting direction designating button one for one, as "DOCUMENT SETTING DIRECTION DATA", and a rotation angle area 121c for storing data as a "ROTATION ANGLE" which indicates a rotation angle (for example, "0°", "270°", "180°" and "90°") for a counterclockwise rotation process to suitably unify the image directions of the output images, which is carried out in the document direction rotation outputting process which will be explained below.

The DRAM control IC 13 controls the writing of the data to the image memory 14 and the reading of the data from the image memory 14. The DRAM control IC 13 is connected with the DRAM control IC 42 of the communication section 40 through the PCI bus to control the input/output of the data between the communication section 40 and the control section 10.

The image memory 14 is made of a DRAM (Dynamic Random Access Memory) and comprises a compressing memory 14a and a page memory 14b. The compressing memory 14a temporarily stores data, such as an image data compressed by a compressing IC 16, in accordance with the control of the DRAM control IC 13. The page memory 14b temporarily stores the image data outputted from the communication section 40 in accordance with the control of the DRAM control IC 13, and temporarily stores the extended image data to output the image data to the communication section 40.

The reading process unit 15 converts an analog electric signal read by the scanner section 30 to a digital data which can be processed in the control section 10 in order to output the data to the compressing IC 16.

The compressing IC 16 compresses the image data outputted from the communication section 40 and the image data outputted from the reading process unit 15.

The extending IC 17 extends the compressed data outputted from the DRAM control IC 13.

In case of necessity, the writing process unit 18 carries out a proofreading process for the image data which is outputted from the extending IC 17 and is processed by the image processing, such as enlargement, reduction, rotation, position change or the like, in accordance with the input instruction outputted from the operation section 20 by the CPU 11 or the instruction data included in the data outputted from the communication section 40. Further, the writing process unit 18 outputs an electrostatic latent image to the printer section 50.

The operation section 20 comprises an operation section controlling unit 21, an LCD 22 having a touch panel, and the like.

The operation section controlling unit 21 receives a display signal from the CPU 11 and carries out a displaying control for the LCD 22. Further, the operation section controlling unit 21 outputs an operation signal from the touch panel of the LCD 22 to the CPU 11.

The LCD (Liquid Crystal Display) 22 displays each type of operation button, the condition of the image, the operation and the condition of each function and the like on the screen in accordance with the display signal outputted from the operation section controlling unit 21. The display screen of the LCD 22 is covered with a transparent sheet panel and is made of a touch panel for outputting a positioning information which is inputted by touching the touch panel with a finger or a proprietary stylus pen as an input information, to the operation section controlling unit 21.

Figure 3:
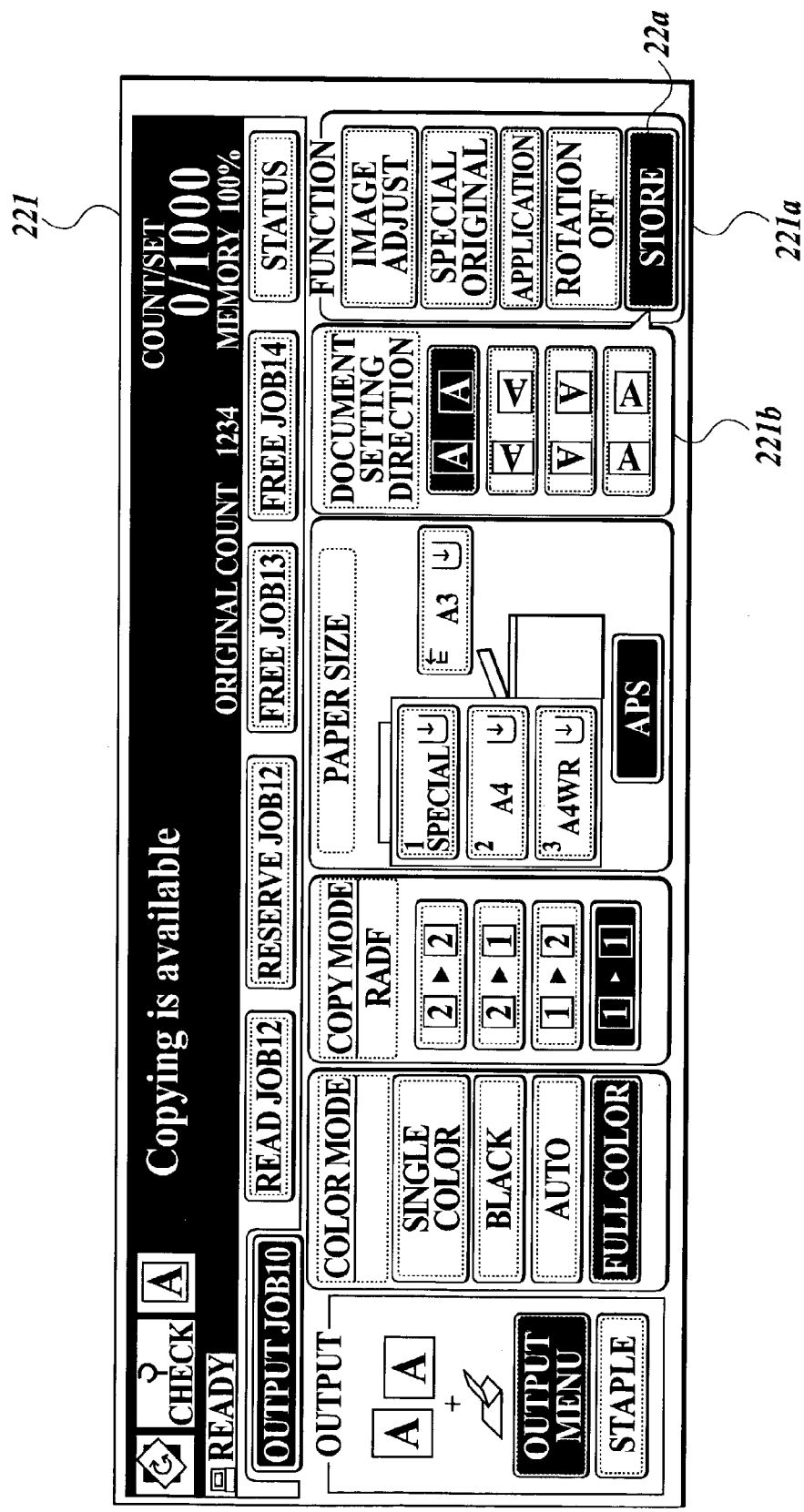
FIG. 3 is a view for showing an operation screen displayed on the LCD shown in FIG. 1.

FIG. 3 is a view for showing an example of an operation screen 221 displayed on the LCD 22. As shown in FIG. 3, the message "Copying is available" indicating the condition of the digital copy machine 1 is displayed on the upper middle part of the operation screen 221. On the right side thereof, the count/the number of the set sheets, the residual quantity of the memory and the like are displayed. On the left side thereof, an icon for indicating the condition of the information terminal device 2, such as a condition for waiting the output of the data from the digital copy machine 1, or the like is displayed. On the lower portion of the screen, various types of operation buttons for operating the digital copy machine 1 by a user, are displayed.

In the present embodiment, on the lower right side of the operation screen 221, an applied function setting area 221a is provided. When the document reading button 22a displayed in the applied function setting area 221a is pushed, the document setting direction area 221b is displayed on the left side thereof. FIG. 4 is a view for showing an example of a document setting direction area 221b. As shown in FIG. 4, on the document setting direction area 221b, four document setting direction designating buttons 22b to 22e are displayed. When one document setting direction designating button is pushed, the image direction of the set document image is designated.

The operation section 20 shown in FIG. 1 further comprises numeral keys, a function button for switching each type of setting, and each type of operation button, such as a start button, which are not shown in the drawings. The operation signal generated by the button operation is outputted from the operation section controlling unit 21 to the CPU 11.

The scanner section 30 is provided under the contact glass for setting the original document and comprises a scanner controlling unit 31, a CCD 32 and the like.

The scanner controlling unit 31 receives the control signal from the CPU 11 and controls the actuation of the CCD 32.

The CCD (Charge Coupled Device) 32 reads the document image by carrying out the image formation for a reflected light of a light for irradiating on the document from a light source which is not shown in the drawings, to scan the image and by carrying out the photoelectric conversion. The read image signal is outputted to the reading process unit 15. In the specification, the image is not limited to an image data, such as a graphic figure, a picture or the like. The image includes a text data, such as a character, a mark or the like.

The communication section 40 comprises a communication controlling unit 41, a DRAM control IC 42, an image memory 43, an I/F 44 and the like.

The communication controlling unit 41 controls the operation of each unit of the communication section 40. The data is transferred or received between the communication controlling unit 41 and the information terminal device 2 connected with the network N.

The DRAM control IC 42 controls the writing of the data to the image memory 43 and the reading of the data from the image memory 43. The DRAM control IC 42 is connected with the DRAM control IC 13 of the control section 10 through the PCI bus and controls the input/output of the data between the communication section 40 and the control section 10.

The image memory 43 is made of a DRAM, and temporarily stores the image data received from the information terminal device 2 through the network N, the image data outputted from the control section 10 through the PCI bus and the like.

The I/F 44 is an interface for connecting the digital copy machine 1 with the information terminal device 2 through the network N. The data is transmitted or received between the I/F 44 and the information terminal device 2 through the network N in accordance with the instruction outputted from the communication controlling unit 41.

The printer section 50 comprises a printer controlling unit 51 and a print unit 52 and the like.

The printer controlling unit 51 receives the control signal outputted from the CPU 11 and controls the operation of each unit of the printer section 50.

The print unit 52 comprises LDs (Laser Diode), a photosensitive drum, a paper feeding part, a discharging part and the like. The print unit 52 feeds a printing paper from the paper feeding part, which has the size and the direction designated by the input instruction outputted from the operation section 20 or the instruction data included in the data received through the communication section 40 in accordance with the printing instruction outputted from the printer controlling unit 51. The print unit 52 controls the actuation of the LDs by the image signal outputted from the writing process unit 18 to form the electrostatic latent image on the surface of the photosensitive drum. Further, by the print unit 52, toner adheres to an area including the electrostatic latent image on the photosensitive drum to transfer the toner to the printing paper fed from the paper feeding part. After the toner is fixed, the paper is discharged from the discharging part.

Next, the operation of the apparatus will be explained.

The document direction rotation outputting process executed by the digital copy machine 1 will be explained with reference to the flowchart of FIGS. 5A and 5B. The process will be explained in case that the digital copy machine 1 is set to the scanner mode.

When the document reading button 22a of the operation screen 221 displayed on the LCD 22 is pushed to read the original document (Step S1), the CPU 11 displays the document setting direction area 221b on the operation screen 221. When one of the document setting direction designating buttons 22b to 22e of the document setting direction area 221b is pushed to designate the document setting direction, the document setting direction data corresponding to the pushed document setting direction designating button is obtained with reference to the document setting direction file 121 (See FIG. 2). In the concrete, when the document setting direction designating button 22b is pushed, the data 1 is obtained. When the button 22c is pushed, the data 2 is obtained. When the button 22d is pushed, the data 3 is obtained. When the button 22e is pushed, the data 4 is obtained (Step S2). The document setting direction may be designated for each page of the set document or may be designated for a bundle of the sheets of the document at once.

When the start button of the operation section 20 is pushed, the CPU 11 instructs the scanner section 30 to read the image information described on the set bundle of sheets of the document for each page (Step S3). The read image data of each page is transmitted through the reading process unit 15 and the compressing IC 16 and is stored in the compressing memory 14a so as to correlate with the document setting direction data by the DRAM control IC 13 (Step S4). After the data is saved, when a bundle of the sheets remains to be read (Step S5; No), the process is back to Step S2 and the CPU 11 repeatedly carries out the Steps S2 to S5 for each bundle.

When all of the images are read (Step S5; Yes), the CPU 11 transfers the process to Step S6. When the output instruction for outputting the images is outputted by operating the predetermined button of the operation section 20 (Step S6; Yes), the image data and the document setting direction data for each page, which are stored in the compressing memory 14a, are extended by the extending IC 17 once to output them to the RAM. Then, it is judged whether the document setting direction data of the first read page is 2(Step S7). When it is judged that the document setting direction data of the first read page is 2 (Step S7; Yes), the CPU 11 rotates the image data of the page by 270° in a counterclockwise direction. The image data is compressed by the compressing IC 16 again and is stored in the compressing memory 14a by the DRAM control IC 13 (Step S8).

When it is judged that the document setting direction data of the first read page is not 2 in Step S7 (Step S7; No), the CPU 11 judges whether the document setting direction data of the first read page is 3 (Step S9). When it is judged that the document setting direction data of the first read page is 3 (Step S9; Yes), the CPU 11 rotates the image data of the page by 180° in a counterclockwise direction. The image data is compressed by the compressing IC 16 again and is stored in the compressing memory 14a by the DRAM control IC 13 (Step S10).

When it is judged that the document setting direction data of the first read page is not 3 in Step S9 (Step S9; No), the CPU 11 judges whether the document setting direction data of the first read page is 4 (Step S11). When it is judged that the document setting direction data of the first read page is 4 (Step S11; Yes), the CPU 11 rotates the image data of the page by 90° in a counterclockwise direction. The image data is compressed by the compressing IC 16 again and is stored in the compressing memory 14*a* by the DRAM control IC 13 (Step S12).

When it is judged that the document setting direction data of the first read page is not 4 in Step S11 (Step S11; No), the CPU 11 does not rotate the image data of the page. The image data is compressed by the compressing IC 16 again and is stored in the compressing memory 14*a* by the DRAM control IC 13 (Step S13).

The CPU 11 repeatedly executes the process from Steps S7 to S13 for all of the pages of the bundles of the document, which are read in Step S2 to S5. When the process from Step S7 to S13 for all of the pages is finished (Step S14; Yes), the CPU 11 outputs (transmits) the image data of each page, which is stored in the compressing memory 14*a*, to the information terminal device 2 through the communication section 40 (Step S15) and finishes the document direction rotation outputting process.

Even though the digital copy machine 1 is set to the copy mode, the document direction rotation outputting process can be carried out. In case of the copy mode, after the process from Step S1 to S14 is carried out, the CPU 11 instructs the extending IC 17 to extend the image data for each page, which is stored in the compressing memory 14*a* and outputs the image data from the printer section 50 through the writing process unit 18.

Hereinafter, the document direction rotation outputting process according to the present invention will be explained by using a concrete example with reference to FIGS. 6 to 11C.

Figure 6:
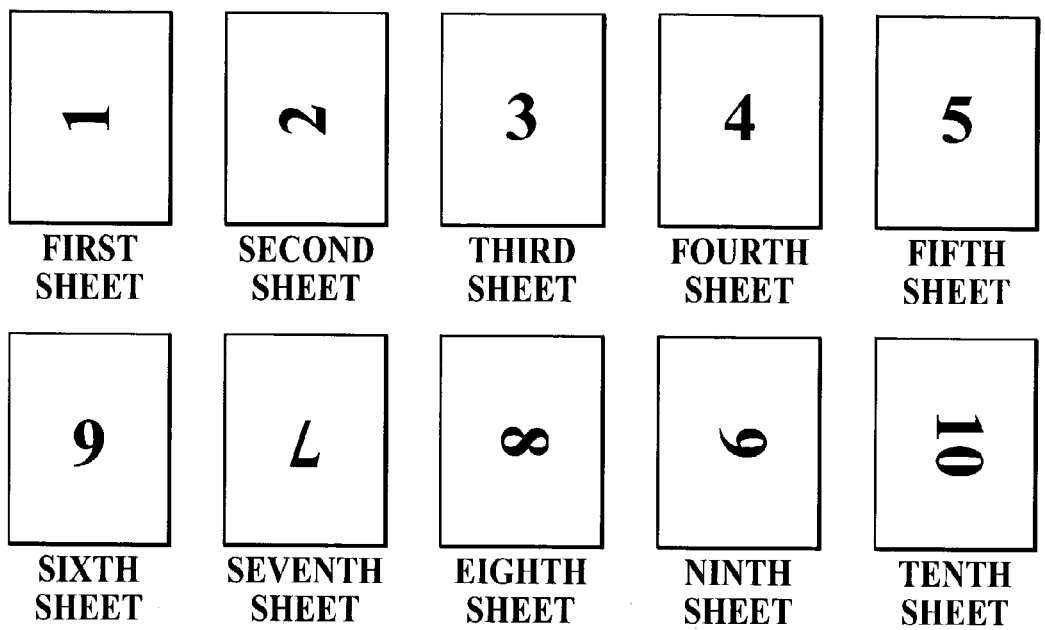
FIG. 6 is a view for showing a document having ten sheets to be read by the digital copy machine to output the images.

FIG. 6 is a view for showing an example of a document having ten sheets to be read and outputted by the digital copy machine 1 in a scanner mode. When each sheet of the document is set in a paper direction shown in FIG. 6, the character directions of ten sheets of the original document are mixed. According to an earlier development, when the ten sheets of the document are read to output the images to the information terminal device 2, as shown in FIG. 6, the images are displayed on the screen of the information terminal device 2 so as to mix the character (image) directions. As a result, it was very difficult for a user to see the images.

The ten sheets of the document are outputted by using the document direction rotation outputting process. Firstly, in Step S1 of FIG. 5A, when the document reading button 22*a* is pushed by a user, the document setting direction area 221*b* is displayed on the operation screen 221. Next, the process from Step S2 to S5 is executed for each bundle of sheets in which the character directions of the images are coincident with each other, to designate the document setting direction and to read the original document.

Figure 7B:
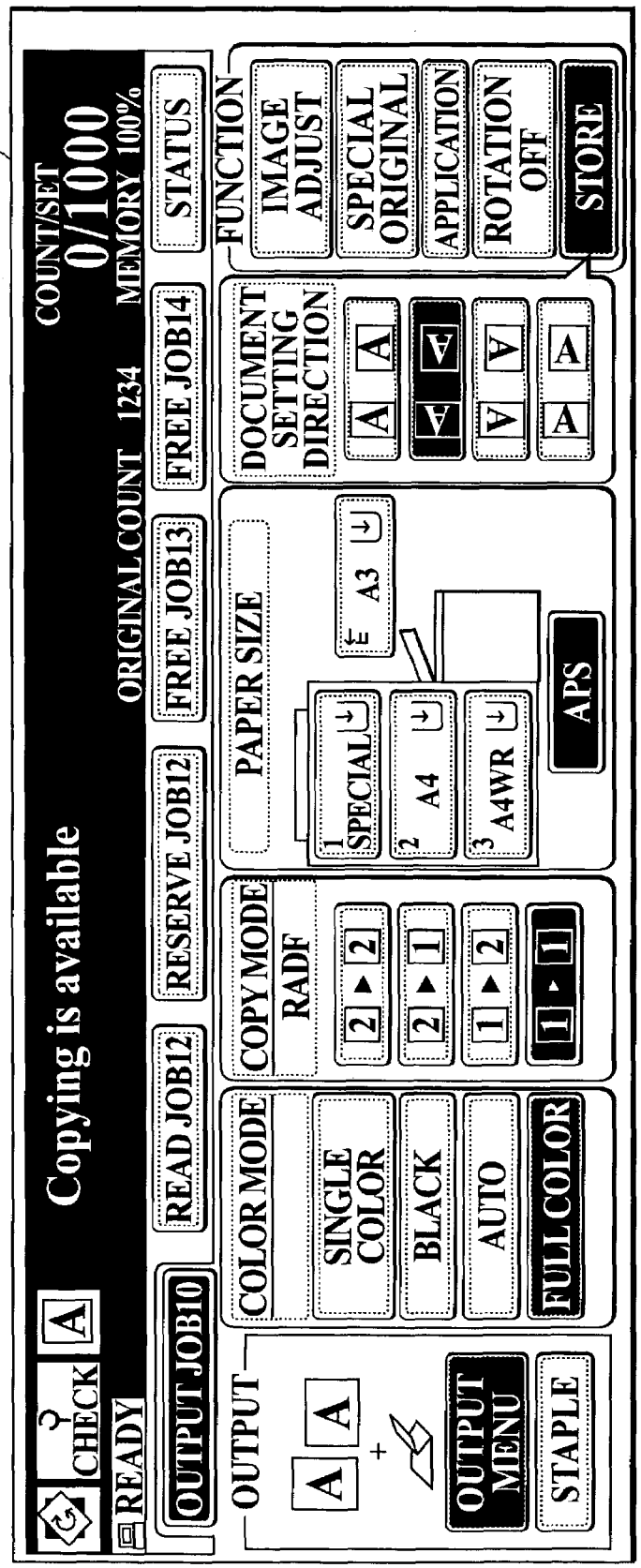
FIG. 7B is a view for showing a setting method for setting the document setting direction on the operation screen when these sheets are read in a scanner mode.

As shown in FIG. 7A, the first sheet and the second sheet shown in FIG. 6 have the same character direction of the document. The upper portion of the character described in each sheet is directed to the left side. When a user sets the bundle of the document having the two sheets on the document setting position without changing the direction and pushes the document setting direction designating button 22*c* and the start button on the operation screen 221 shown in FIG. 7B, the digital copy machine 1 reads two sheets of the document and obtains the document setting direction data (in this case, obtains the data 2).

Figure 8A:
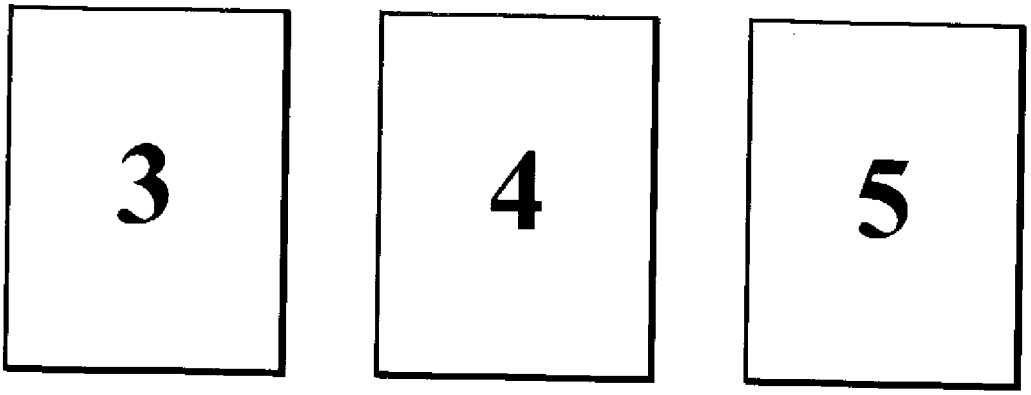
FIG. 8A is a view for showing a third sheet to a fifth sheet shown in FIG. 6.
Figure 8B:
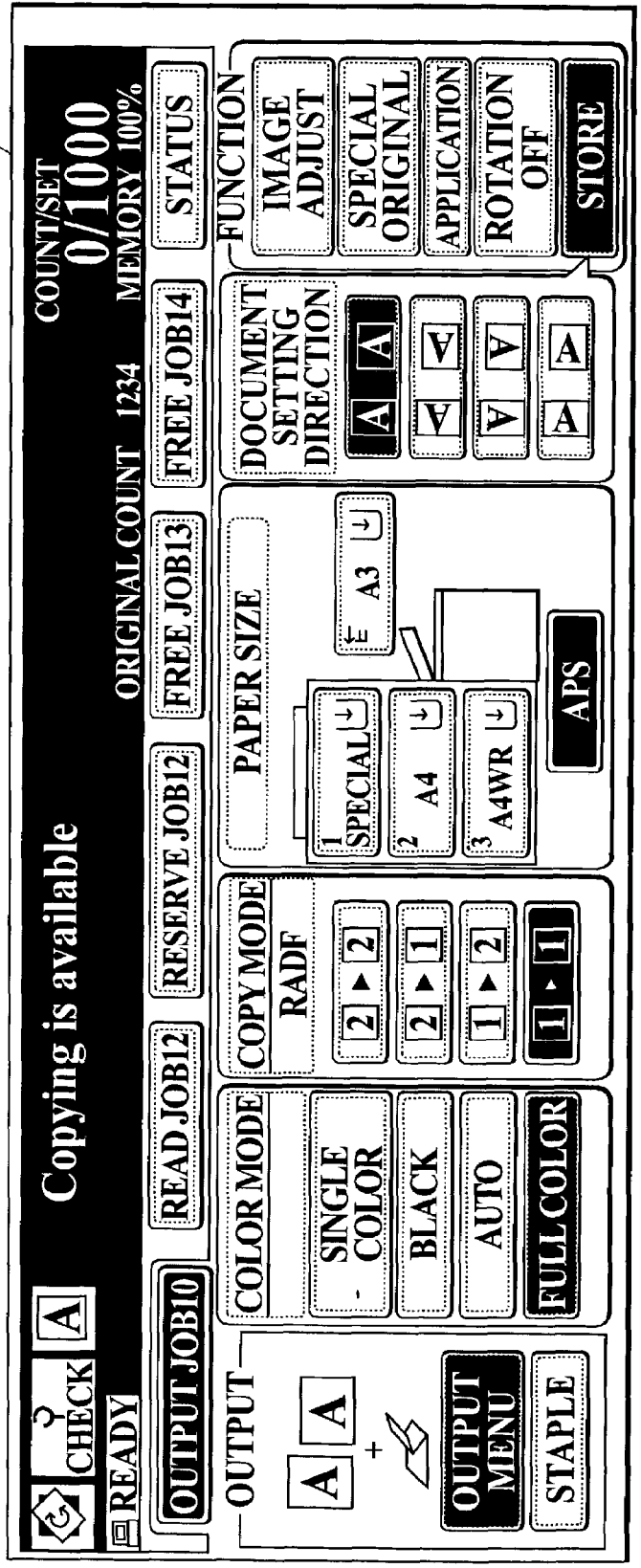
FIG. 8B is a view for showing a setting method for setting the document setting direction on the operation screen when these sheets are read in a scanner mode.

As shown in FIG. 8A, the third to fifth sheets shown in FIG. 6 have the same character direction of the document. The upper portion of the character described in each sheet is directed to the upper side. When a user sets the bundle of the document having the three sheets on the document setting position without changing the direction and pushes the document setting direction designating button 22*b* and the start button on the operation screen 221 shown in FIG. 8B, the digital copy machine 1 further reads three sheets of the document and obtains the document setting direction data (in this case, obtains the data 1).

Figure 9B:
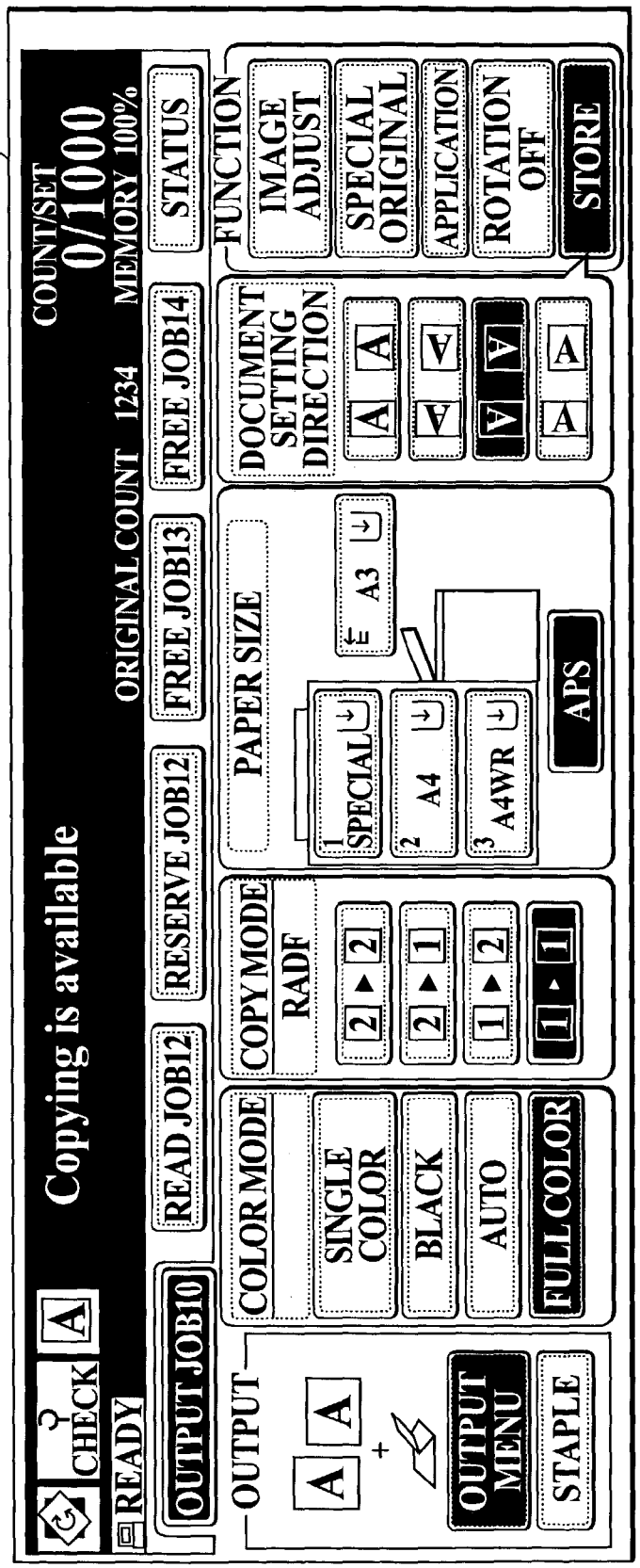
FIG. 9B is a view for showing a setting method for setting the document setting direction on the operation screen when these sheets are read in a scanner mode.

As shown in FIG. 9A, the sixth sheet and the seventh sheet shown in FIG. 6 have the same character direction of the document. The upper portion of the character described in each sheet is directed to the lower side. When a user sets the bundle of the document having the two sheets on the document setting position without changing the direction and pushes the document setting direction designating button 22*d* and the start button on the operation screen 221 shown in FIG. 9B, the digital copy machine 1 further reads two sheets of the document and obtains the document setting direction data (in this case, obtains the data 3).

Figure 10A:
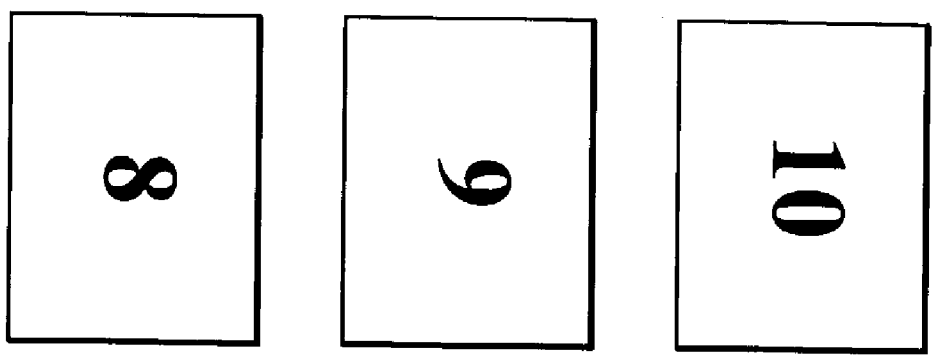
FIG. 10A is a view for showing an eighth sheet to a tenth sheet shown in FIG. 6.
Figure 10B:
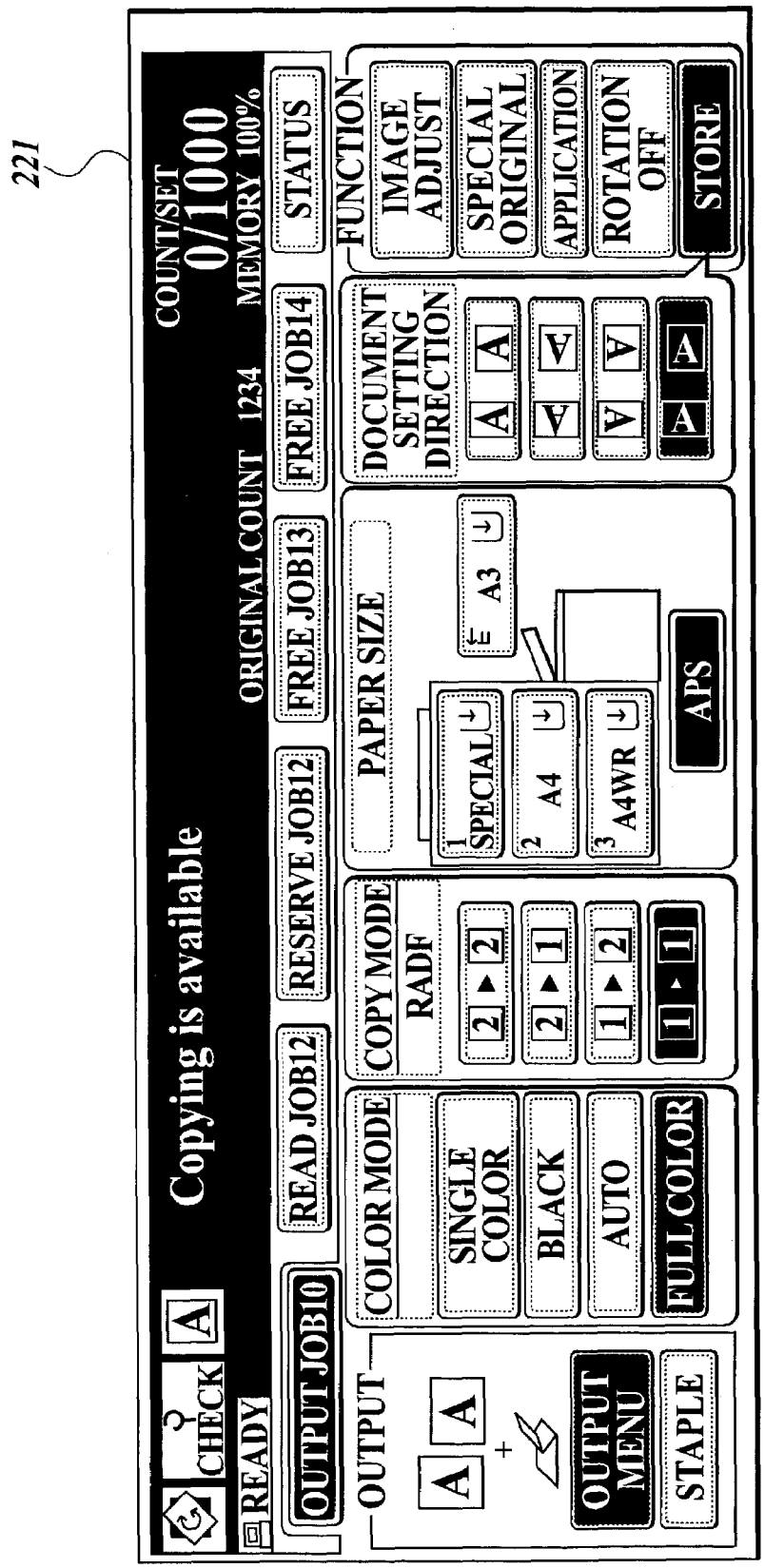
FIG. 10B is a view for showing a setting method for setting the document setting direction on the operation screen when these sheets are read in a scanner mode.

As shown in FIG. 10A, the eighth to tenth sheets shown in FIG. 6 have the same character direction of the document. The upper portion of the character described in each sheet is directed to the right side. When a user sets the bundle of the document having the three sheets on the document setting position without changing the direction and pushes the document setting direction designating button 22*e* and the start button on the operation screen 221 shown in FIG. 10B, the digital copy machine 1 further reads three sheets of the document and obtains the document setting direction data (in this case, obtains the data 4).

Figure 11A:
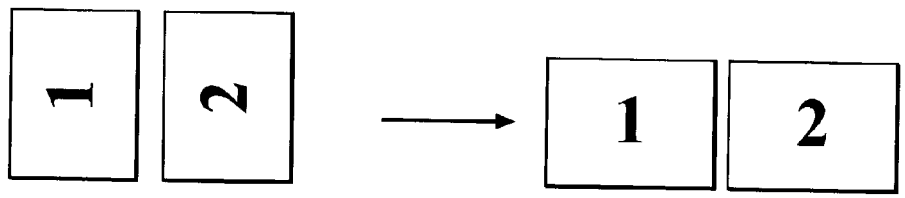
FIGS. 11A, 11B and 11C are views for showing each example of the rotating processes which are carried out for each sheet of FIG. 6 in accordance with the document direction rotation outputting process shown in FIGS. 5A and 5B.
Figure 11B:
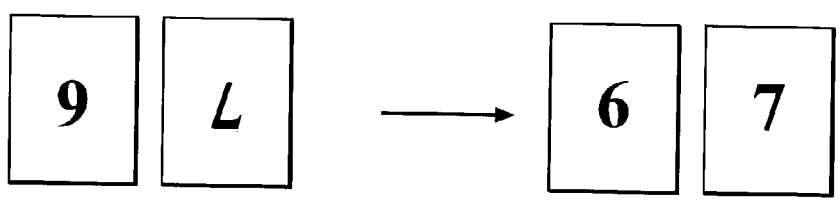
Figure 11C:
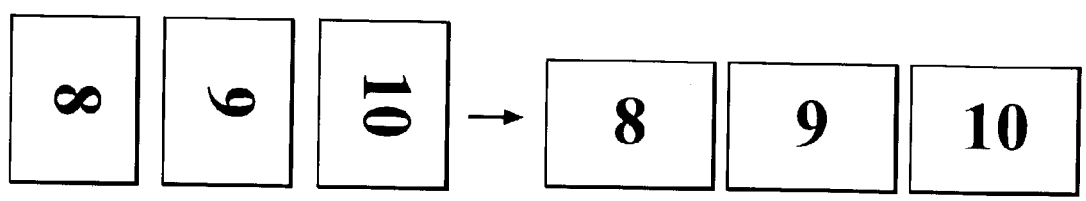

When all of the ten sheets of the document are read and the output instruction is outputted, the process from Step S7 to S14 is executed to carry out the rotation process for the read image data in accordance with the obtained document setting direction data. The image data relating to the first and second sheets are rotated by 270° in a counterclockwise direction as shown in FIG. 11A. The image data relating to the third to fifth sheets are not rotated. The image data relating to the sixth and seventh sheets are rotated by 180° in a counterclockwise direction as shown in FIG. 11B. The image data relating to the eighth to tenth sheets are rotated by 90° in a counterclockwise direction as shown in FIG. 11C.

Figure 5B:
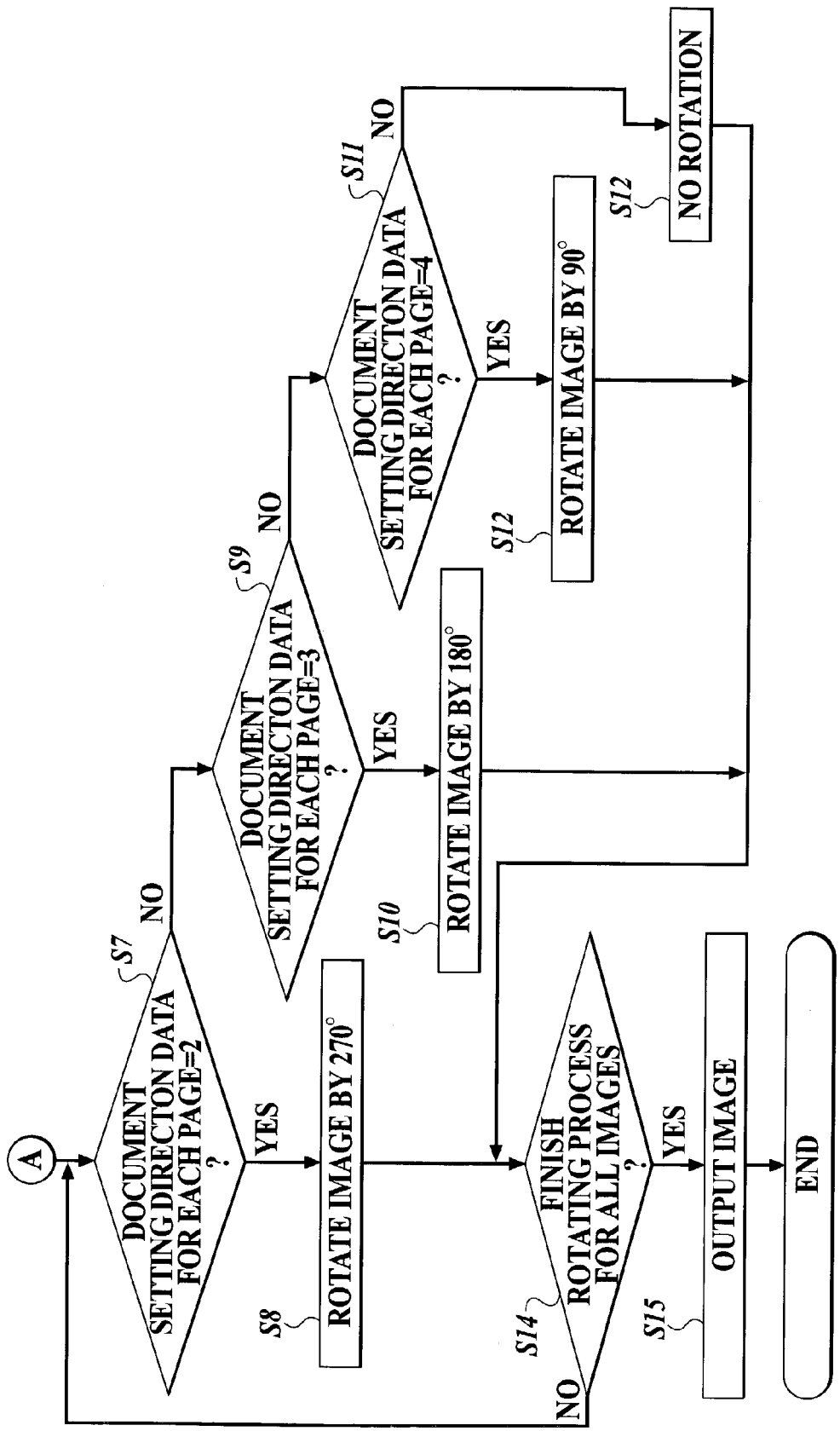
Figure 12:
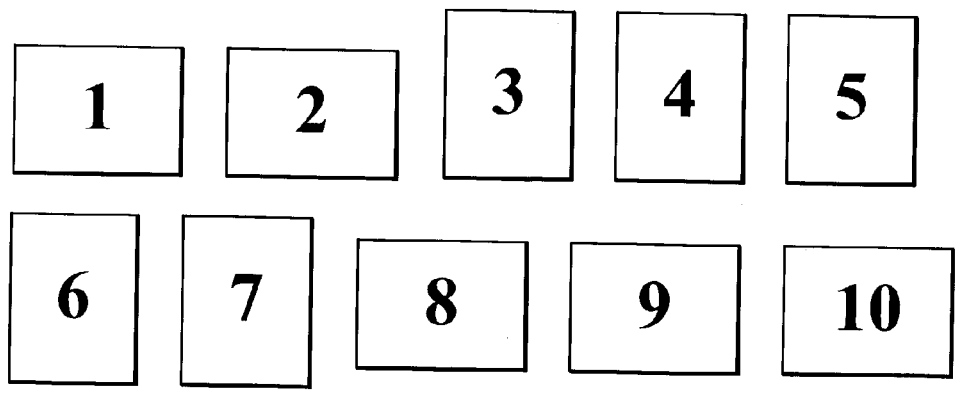
FIG. 12 is a view for showing the output images obtained by carrying out the document direction rotation outputting process of FIGS. 5A and 5B for the first to tenth sheets of FIG. 6.

After the rotation process is finished, the images are outputted in Step S15 of FIG. 5B. When the image data which is processed by the document direction rotation outputting process, are displayed on the display screen of the information terminal device 2, the output images are obtained so as to unify the character directions of the output images as shown in FIG. 12.

As explained above, according to the digital copy machine 1, a reading instruction for reading the original document is outputted by using the operation screen 221. The document setting direction is designated by pushing the document setting direction designating button. When the start button is pushed, the CPU 11 obtains the document setting direction data corresponding to the pushed document setting direction designating button with reference to the document setting direction file 121. The bundle of the set sheets is read for each page by the scanner section 30. The read image data and the obtained document setting direction data are stored in the image memory 14 so as to correlate with each other. When the image reading for all of the sheets of the document is finished and the output instruction for outputting the image is outputted, the CPU 11 recognizes the direction of the read image data by using the corresponding document setting direction data and carries out the rotation process for the obtained image data in accordance with the document setting direction data so as to unify the directions of the image data. When the rotation process for the image data of all of the pages is finished, the CPU 11 outputs the rotated image data to the information terminal device 2 through the communication section 40. Alternatively, the CPU 11 outputs the rotated image data from the printer section 50 through the writing process unit 18.

Therefore, in case that a document having a plurality of sheets in which the various character (image) directions are mixed, is read in a scanner mode and the image data are outputted, the document setting direction can be designated for each bundle of the sheets in which the character directions are coincident with each other. Therefore, it is possible to obtain the output images at the information terminal device, such as a destination personal computer so as to unify the character (image) directions. In case that the document having a plurality of sheets in which the various character (image) directions are mixed, is read in a copy mode and the image data are outputted, it is possible to obtain the output images so as to unify the character (image) directions).

The description relating to the above embodiment is a preferred example of the digital copy machine 1 according to the present invention. The present invention is not limited to this.

For example, the operation screen 221 is one example. As long as the image forming apparatus has a reading instruction and designates the document setting direction, the present invention is not limited to this.

In the embodiment, the image forming apparatus having a copy function, a scanner function and a printer function is explained. However, the present invention can be applied to the image forming apparatus having a copy function or a scanner function, individually.

It is explained that the rotation process is carried out for each bundle of the sheets in which the character directions are coincident with each other. However, the rotation process may be carried out for each page. Further, in the embodiment, the image data is rotated in a counterclockwise direction. However, the present invention is not limited to this. As long as proper output images are obtained so as to unify the character (image) directions, the rotating direction is not limited.

The detail construction and the detail operation of the digital copy machine 1 and the whole structure of the present invention can be modified without departing from the gist of the present invention.

The entire disclosure of Japanese Patent Application No. Tokugan 2002-128251 filed on Apr. 30, 2002 including specification, claims drawings and summary are incorporated herein by reference in its entirety.

What is claimed is:

1. An image forming apparatus comprising:
    an image reading section for reading a plurality of document images of a bundle of documents having a plurality of sheets page by page, the bundle of documents being set on a reading position and the document images having a same image direction;
    a designating section for designating a document setting direction for the bundle of documents which is set on the reading position and in which the document images have the same image direction;
    a storing section for storing the document images read by the image reading section;
    an image forming section for storing image data of each sheet of the bundle of documents in the storing section so as to correlate with the designated document setting direction when the document images of the bundle of documents are read by the image reading section, recognizing a rotation angle of the image data for each sheet for directing the image direction to a reference direction which is previously set based on the document setting direction of each sheet stored in the storing section after the bundle of documents are read, and executing an image processing operation in which the image data is rotated for each sheet by the recognized rotation angle; and
    an output section for outputting the image data for which the image processing operation is executed.

2. The apparatus of claim 1, further comprising a communication section for communicating with an external information terminal device, wherein the output section outputs the image data for which the image processing is executed to the external information terminal device through the communication section.

3. The apparatus of claim 1, wherein the output section is a print section for printing the image data for which the image processing is executed.

4. The apparatus of claim 1, wherein the rotation angle is one of 270°, 180°, 90° and 0°.

5. An image forming method comprising: reading a plurality of document images of a bundle of documents which is set on a reading position and in which the document images have a same image direction;
    designating a document setting direction for the bundle of documents which is set on the reading position and in which the document images have the same image direction;
    storing the image data of each sheet of the bundle of documents in a storing section so as to correlate with the designated document setting direction when the document images of the bundle of documents are read by an image reading section;
    recognizing a rotation angle of the image data for each sheet for directing the image direction to a reference direction which is previously set based on the document setting direction of each sheet stored in the storing section after the bundle of documents are read, and executing an image processing operation in which the image data is rotated for each sheet by the recognized rotation angle; and
    outputting the image data for which the image processing operation is executed.

6. The method of claim 5, wherein the outputting is carried out by outputting the image data for which the image processing is executed to an external information terminal device through a communication section.

7. The method of claim 5, wherein the outputting is carried out by printing the image data for which the image processing is executed.

8. The method of claim 5, wherein the rotation angle is one of 270°, 180°, 90° and 0°.

* * * * *